(12) United States Patent
Pelzer et al.

(10) Patent No.: US 7,838,125 B2
(45) Date of Patent: Nov. 23, 2010

(54) MICROPERFORATED METAL FOIL

(75) Inventors: Marc Pelzer, Baar (CH); Stefan Janzen, Wetter/Ruhr (DE)

(73) Assignee: Pelzer Acoustic Products, LLC, Thomson, GA (US)

( * ) Notice: Subject to any disclaimer, the term of this patent is extended or adjusted under 35 U.S.C. 154(b) by 440 days.

(21) Appl. No.: 11/956,441

(22) Filed: Dec. 14, 2007

(65) Prior Publication Data

US 2009/0274924 A1    Nov. 5, 2009

(51) Int. Cl.
*B32B 3/10*  (2006.01)
(52) U.S. Cl. ............... 428/596; 428/597; 428/603; 428/606; 428/613; 428/621; 428/686; 428/687; 428/318.4
(58) Field of Classification Search ............... None
See application file for complete search history.

(56) References Cited

U.S. PATENT DOCUMENTS

| | | | |
|---|---|---|---|
| 4,287,248 A * | 9/1981 | Gessner et al. | 428/137 |
| 6,600,888 B2 * | 7/2003 | Mishra et al. | 399/174 |
| 6,820,720 B1 * | 11/2004 | Nicolai et al. | 181/292 |
| 2007/0187907 A1 * | 8/2007 | Potier | 277/654 |

FOREIGN PATENT DOCUMENTS

| | | |
|---|---|---|
| DE | 2253990 | 5/1973 |
| DE | 2410060 A1 | 9/1975 |
| DE | 2623851 A1 | 12/1977 |
| DE | 3321094 C2 | 12/1983 |
| DE | 4226872 A1 | 2/1994 |
| DE | 19751983 A1 | 5/1999 |
| DE | 69717789 T2 | 9/2003 |
| DE | 20316050 U1 | 12/2003 |
| DE | 10253830 A1 | 6/2004 |
| WO | WO01/12470 A1 | 2/2001 |

OTHER PUBLICATIONS

Translation of DE 10253830.*

* cited by examiner

*Primary Examiner*—Ling Xu
(74) *Attorney, Agent, or Firm*—Harness Dickey & Pierce, PLC

(57) ABSTRACT

The invention relates to a microperforated metal foil and to a process for the preparation thereof which is characterized in that a self-supporting metal foil is perforated with a needle-punching machine.

9 Claims, 4 Drawing Sheets

MICROPERFORATED METAL FOIL

FIELD

The invention relates to a microperforated metal foil and to a process for the preparation thereof.

BACKGROUND

The absorption principle of microperforation has been known and described just for sound insulation in numerous printed documents (cf., for example, WO 01/12470 A1). In principle, it is the application of parallel Helmholtz resonators that may be arranged in front of a fibrous or porous absorber material. The principle of such an arrangement, so-called perforated absorbers, has long been known and is also described in some detail in the technical literature.

On the other hand, needle-punching machines for needle-punching fibers to a needle-punched non-woven have been known independently thereof.

From DE 33 21 094 C2, a textile material for the preparation of quilts, clothing, pillows, cushions or carpets has been known in which an aluminum layer is applied to the textile material and treated with a needle-punching machine. This aluminum layer is applied by vapor deposition, for example, and therefore is not self-supporting.

DE 22 53 990 describes the line-shaped perforation of a variety of materials.

DE 42 26 872 A1 describes the perforation of wood.

DE 26 23 851 A1 describes the perforation of a plastic sheet.

DE 697 17 789 T2 describes a material plate of metal with microslits.

DE 102 53 830 A1 describes the perforation of aluminum foil by means of a perforation knife with teeth.

DE 24 10 060 A1 describes a device for perforating sheets of plastic, artificial leather, paper or composite material.

DE 197 51 983 A1 describes the needle perforation of plastic sheets.

DE 2203 16 050 U1 describes the microperforation of aluminum foils by means of a porcupine roller.

The perforated foils known to date for sound insulation have the drawback that either they are very complicated to prepare, or the foil must be relatively thick in order that the perforation channels have a length sufficient for sound insulation.

SUMMARY

Thus, the object of the present invention is to prepare a microperforated foil having as good sound insulation properties as possible at low cost and as simply as possible.

DRAWINGS

FIG. 1 is a photo depicting needle punch perforations in a metal sheet;

FIG. 2 is a photo depicting needle punch perforations in a metal sheet;

FIG. 3 is a graph depicting the parameters of the needle punch perforation referenced in FIG. 1; and FIG. 4 is a graph depicting absorption characteristics for a variety of perforation sizes employing a uniform material sample.

DETAILED DESCRIPTION

In a first embodiment, the object of the invention is achieved by a process for the preparation of a microperforated metal foil, characterized in that a self-supporting metal foil is perforated with a needle-punching machine.

Thus, for the first time, the perforation of metal foils is effected by means of a needle-punching machine that is normally employed for the preparation of textile needle-punched non-wovens. With this novel process, different shapes, sizes and numbers of perforations can be achieved depending on the acoustic objective, and other parameters can be changed, and thus holes can be punched into virtually any kind of foils. Depending on the design of the foil perforation and the fibrous or porous absorber material that is optionally covered with it, exactly precalculated absorption behaviors can be achieved. For example, in addition to a purposeful absorption behavior, this additionally enables a more or less high heat reflection depending on the sheet material chosen to obtain absorbing products which can be employed over a large range of temperatures.

In addition to the known parameters, such as perforation diameter, number of perforations and perforation pitch as well as foil thickness, a substantially higher throat length of the resonator in the form of the punching rims or punching degree of the perforations as compared to the foil thickness can also be achieved with this novel process. Thus, in acoustic terms, the absorption characteristics of a substantially thicker foil is achieved by means of a thinner foil and longer throat. The throats are formed when the foil is pierced with the needle and have a characteristic shape, which can be seen from the Figures.

This has the advantage that more frictional energy is achieved in the longer throat of the perforation, and thus a higher proportion of the vibrational energy of the impinging sound wave can be converted to heat. Thus, a higher absorption performance can be achieved with a thinner and lighter and consequently less expensive foil.

To date, it has not been tried to optimize the absorber performance or minimize the foil thickness and thus the weight and cost by selectively influencing the ratio of throat length to the foil thickness. As can be shown by a simple sensitivity analysis for the calculation of a Helmholtz resonator, the throat length has one of the greatest sensitivities and is thus particularly suitable for increasing the scattering width of a microperforated foil. The acoustic object is to obtain as large an absorption width as possible in order to be able to optimally absorb broad-band noises.

Within the physical limits, a desired frequency range can be selectively preselected and precalculated by means of some parameters, such as foil thickness, the perforation diameter, the perforation pitch, the absorber thickness or the choice of absorber material.

Thus, with the process according to the invention, a metal foil can be obtained which enables a higher absorption performance, a greater acoustic width and a reduction of cost and weight by using thinner foils, mainly in combination with an absorber material and/or air cushion.

By using a conventional needle-punching machine as usually employed for the preparation of needle-punched non-wovens, further process-immanent advantages appear. Thus, a higher scattering width of the perforation geometry (diameter and throat length) and a purposeful deep-drawing of the "punching rim" and thus an extension of the "acoustically effective throat length" of the perforation can be achieved.

By a purposeful extension of the scattering width, which can be selectively controlled through the geometry of the needle tip, and the substantial extension of the length of the punching burr also achieved thereby, a substantially larger overall scattering width is achieved as compared to normal punchings using a punch and die or porcupine roller.

The punching rim 1 within the meaning of the invention is the raised rim of the perforation crater 1 formed by the needle-punching treatment. The punching burr 2 within the meaning of the invention is the immediate edge of the perforation 2 positioned on the opposite side of the punching rim 1. In a manner of speaking, the punching burr 2 is that part of the hole where the metal foil actually tears apart and is pierced.

By increasing the so-called acoustic "throat length" (the length of the Helmholtz resonator, i.e., of the perforation), at a given foil thickness, a hole is achieved as in a substantially thicker foil in terms of acoustic effectiveness without having to put up with the disadvantage of the heavier and thus substantially more expensive foil.

Further, with this approach, the absorption arising in the microperforation from the air friction at the material in the "throat" of the perforation can be increased, and thus the absorption performance per perforation enhanced. A longer friction length in the perforation means the conversion of more kinetic energy into frictional heat. In addition, a frequency shift of absorption can be achieved by the different throat length. In addition, the intensity of the absorption and the frequency of the absorption can be adjusted through the perforation diameter and the perforation pitch.

"Microperforated" within the meaning of the invention means that the perforations have diameters of below 1 mm. A "foil" within the meaning of the invention is a body having two essentially flat parallel surfaces having a distance within a range of from 5 to 1000 μm. A "metal" within the meaning of the invention is a material that predominantly consists of one or more of the following elements: all elements of the 1st to Vth main groups except for H, B, C, Si, N, P and As; Po; all elements of the subgroups. It is particularly preferred to employ Al for the metal foil in the process according to the invention, since this material is particularly lightweight and thus weight can be saved in the resulting product.

Also preferred are high-temperature resistant or refractory stainless steels due to their being used as a sound-absorbing component in areas of high thermal load (for example, the exhaust tract of motor vehicles).

In a further embodiment, the object of the invention is achieved by a microperforated metal foil prepared by the process according to the invention that has a thickness of at least 10 μm. Below this thickness, the sound-absorbing effect is significantly decreased. In the vapor-deposited foils known to date from heat insulation, the layer thickness is usually even less than 1 μm and thus so low as to be acoustically virtually ineffective.

More particularly, the thickness of the metal foil is within a range of from 25 to 800 μm, especially up to 500 μm, even more preferably up to 300 μm.

The perforation diameter is advantageously within a range of from 50 to 800 μm, especially within a range of from 200 to 500 μm. The perforation diameter is defined on the basis of upper edge of the crater rim of the perforation crater, i.e., the punching rim. The number of perforations per $cm^2$ is advantageously within a range of from 5 to 200, especially within a range of from 20 to 100.

The perforation size and shape can be determined, for example, simply by means of the needle geometry employed. In contrast, the design of the needle tip (blunt or acute) essentially influences the perforation depth (crater depth) formed when the needle penetrates the foil material before the needle finally pierces the material and the actual perforation is formed.

Naturally, the expandability and toughness of the foil material employed also plays an important role. In the interplay between the material and needle shape, the throat length relative to the foil thickness can be thus maximized.

In addition, the perforation size can be varied by the puncture depth of a, for example, conical needle.

Through the number of needles in the needle board, the lifting speed of the needle machine and the feeding speed of the foil, for example, the number of perforations per unit area or the fraction of the open surface in percent can be varied at will. Therefore, all in all, the process according to the invention is highly suitable for preparing virtually any perforation pattern.

Advantageously, a porous and/or fibrous absorber is bonded to the metal foil. The sound absorption can be significantly improved thereby. For this purpose, the absorber is preferably a foam layer. Advantageously, in turn, the foam layer consists of a lightweight foam material. In addition, it is preferably non-combustible. The layer thickness of the foam layer is advantageously within a range of from 5 to 50 mm, especially up to 15 mm. These properties have been found particularly efficient in sound absorption for the absorber or the foam layer.

The crater surrounding the perforations is advantageously raised, and the average depth of the perforations as measured from the upper edge of perforation crater 1 to the edge of the punching burr 2 on the opposite side of the metal foil is at least twice the thickness of the metal foil itself. Thus, the depth of the perforations is measured from the upper edge of the punching rim 1, which is essentially the upper edge of the perforation crater 1. Due to their being generated by a needle-punching machine, the perforations have a particularly advantageous design. Thus, namely, a relatively thin foil can be employed and yet a relatively great depth of the perforations achieved, so that a particularly efficient sound absorption is in turn possible, as has been set forth above.

EXAMPLE

A 50 μm thick aluminum foil was perforated by means of a commercially available needle-punching machine (DILOOM OD-II 65 of Oscar Dilor Maschinenfabrik KG) in such a way that 80 perforations per $cm^2$ having a diameter of 340 μm each were formed. This perforated foil was provided with a 9 mm thick commercially available sound-absorbing flexible foam layer having a bulk density of about 15 $kg/m^3$.

This metal foil provided with a foam layer shows very good sound-absorption characteristics, as can be seen from FIG. 4.

Figure 1:
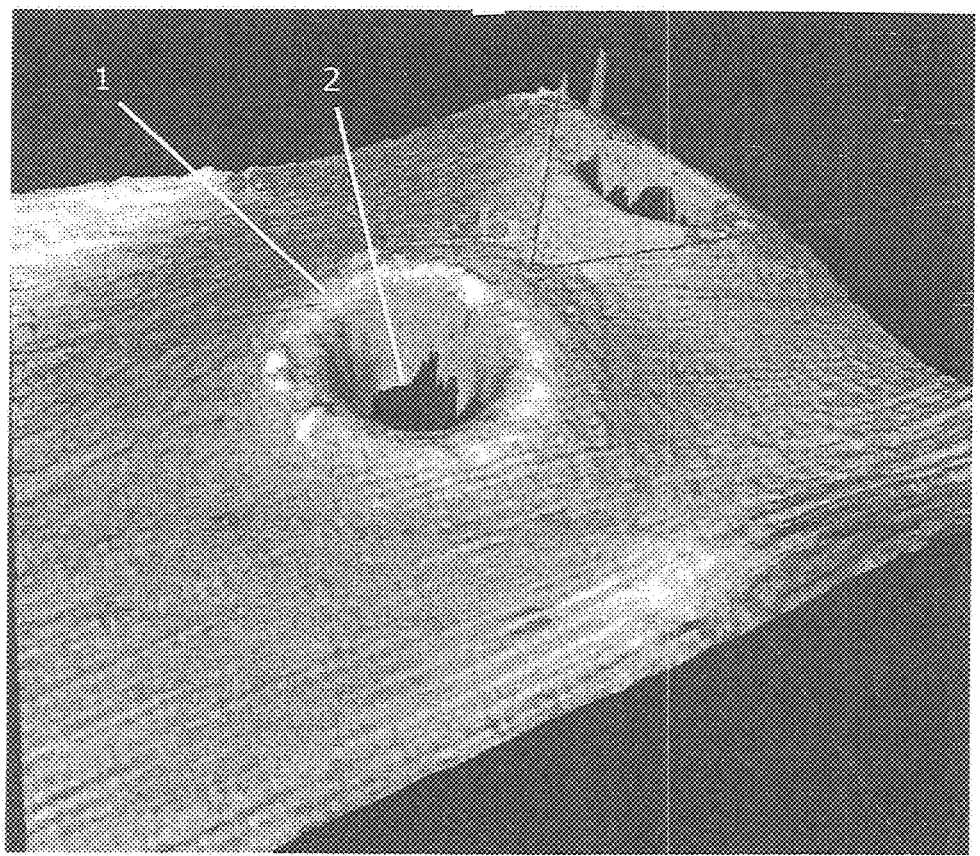
FIG. 1 and FIG. 2 show a perforation of a microperforated metal foil according to the invention from different perspectives. The foil is an aluminum foil. The image was taken with an atomic force electron microscope. The punching rim (upper edge of the perforation crater) 1 and the punching burr 2 are clearly recognizable.
Figure 2:
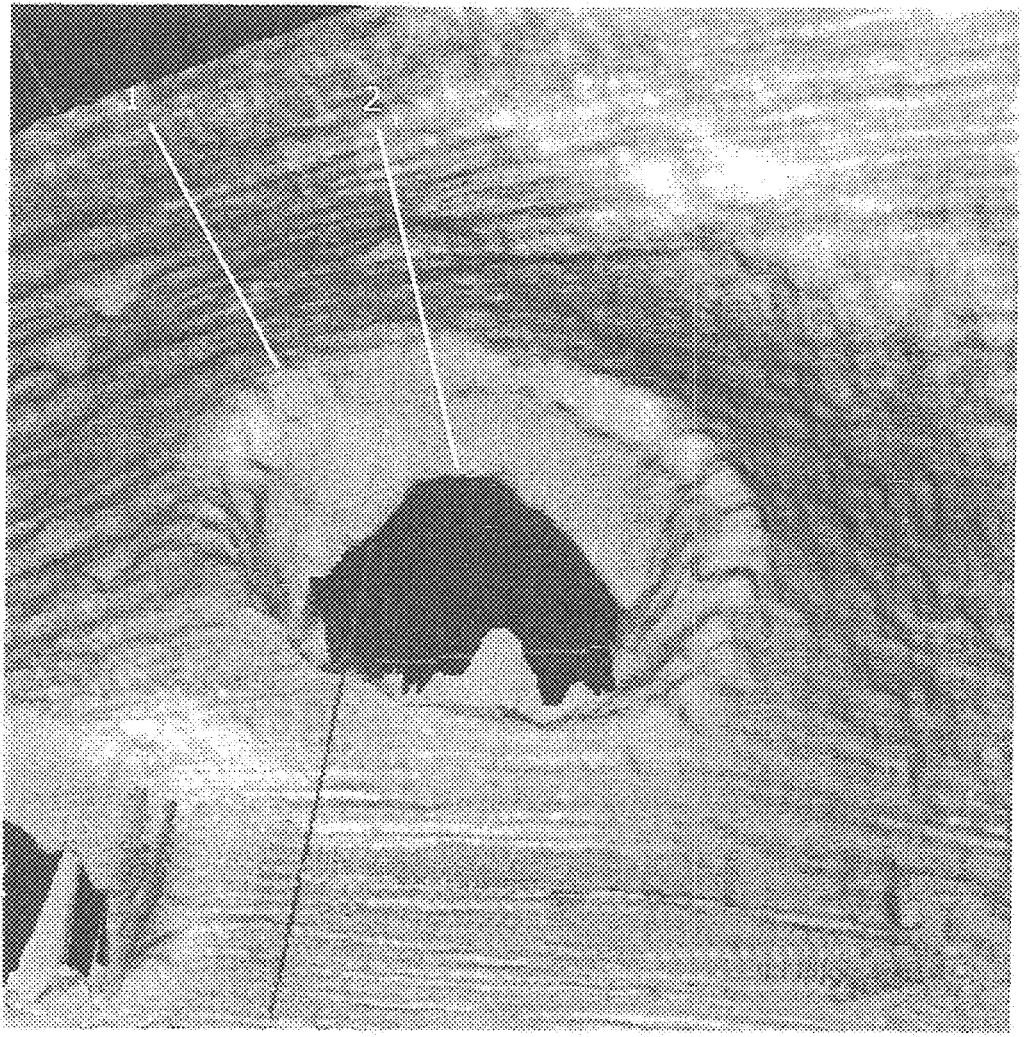
Figure 3:
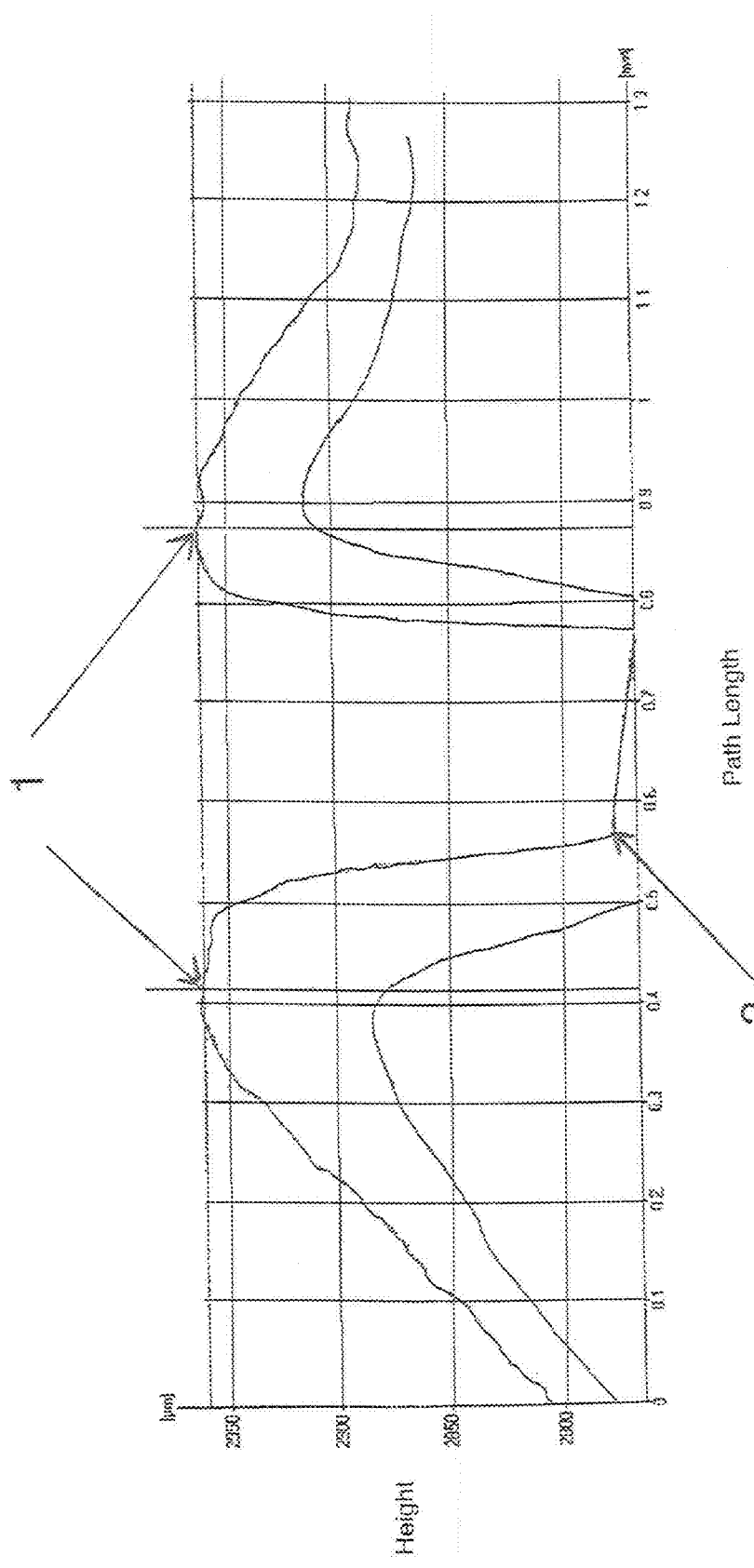
FIG. 3 shows the height profile of the perforation shown in FIG. 1 and FIG. 2. Vertical lines mark the sites that represent the upper edge of the perforation crater, i.e., the punching rim. These were used as a basis for establishing the perforation diameter. In the present case, the perforation diameter is 456 μm along the upper edge of the crater, i.e., punching rim. The depth of the perforation can also be estimated to about 190 μm. The thickness of the aluminum foil was 50 μm. The punching rim 1 and the punching burr 2 are designated accordingly.
Figure 4:
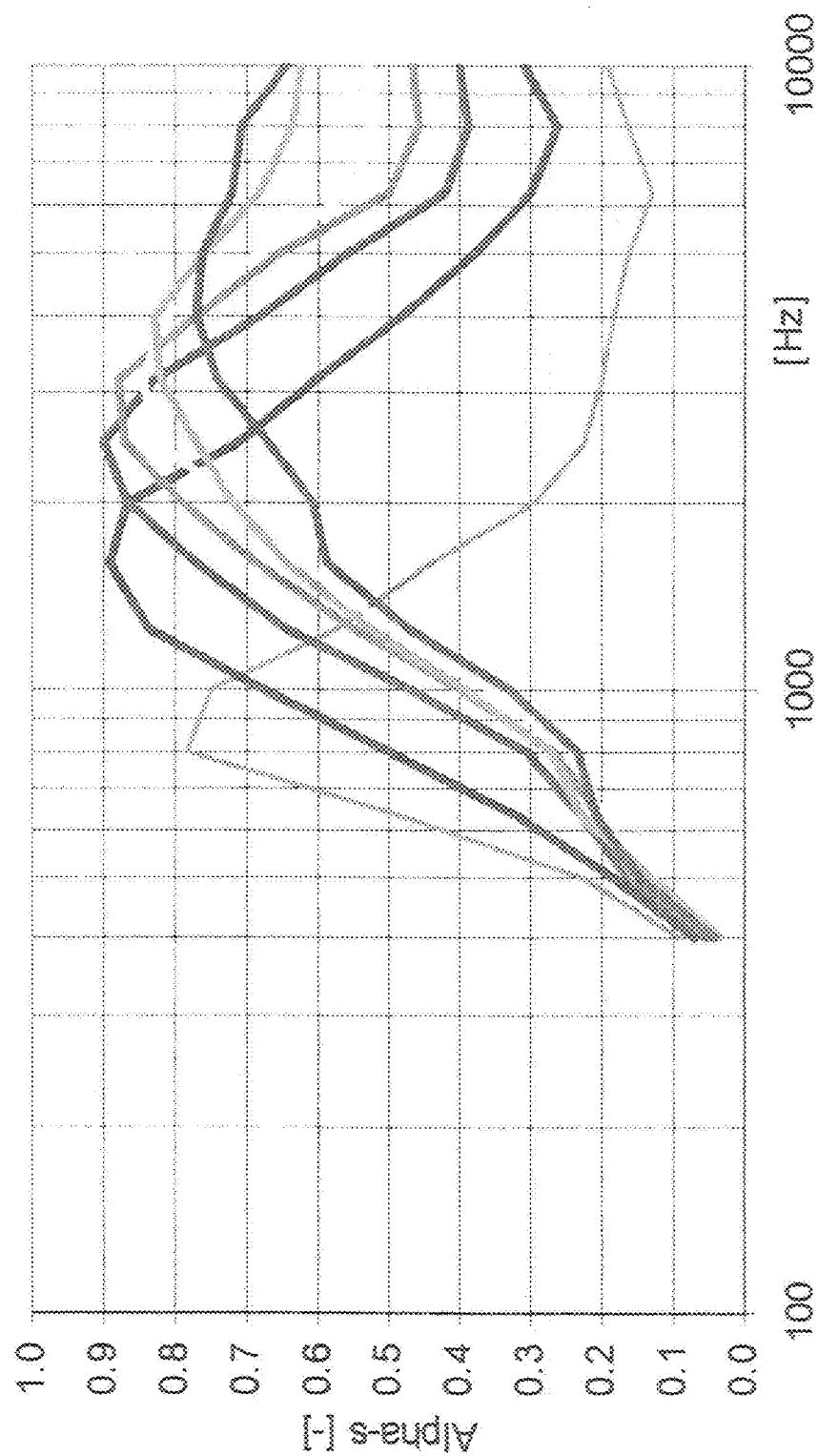
FIG. 4 shows the absorption characteristics of differently perforated 50 μm thick aluminum foils provided with a 9 mm thick commercially available sound-absorbing flexible foam layer having a bulk density of about 15 kg/m$^3$. A total of 6 lines are depicted. The sound absorption was recorded in a sound-proof cabin. The absorption coefficient alpha-s is plotted against the frequency, where the absorption coefficient alpha-s is the quotient of the effective absorption area by the surface area. In the order in which the lines meet the right-hand edge of the diagram, there are shown from top to bottom.

perforation diameter 0.26 mm; perforation density 213/cm$^2$;

perforation diameter 0.26 mm; perforation density 95/cm$^2$;
perforation diameter 0.3 mm; perforation density 42/cm$^2$;
perforation diameter 0.24 mm; perforation density 41/cm$^2$;
perforation diameter 0.2 mm; perforation density 34/cm$^2$;
perforation diameter 0.15 mm; perforation density 19/cm$^2$.
The following was shown:

The lower the perforation density was, the lower was the sound absorption, mainly at high frequencies, and the lower was the frequency of the sound-absorption maximum.

What is claimed is:

1. A microperforated metal foil comprising:
a metal foil having a thickness of at least 10 μm and a plurality of microperforations which are surrounded by raised craters occurring on one side of the foil and punched burrs occurring on the opposite side of the foil;
the average diameter of the microperforations is within a range of from 50 to 800 μm; and
the number of perforations per cm$^2$ is within a range of from 5 to 200;
wherein the microperforations have an average depth as measured from the upper edge of the raised crater to the edge of the punched burr which is at least twice the thickness of the metal foil itself.

2. The metal foil according to claim 1, wherein the thickness is within a range of from 25 to 800 μm.

3. The metal foil according to claim 1, wherein a porous and/or fibrous absorber is bonded to the metal foil.

4. The metal foil according to claim 3, wherein said absorber is a foam layer.

5. The metal foil according to claim 4, wherein said foam layer consists of a lightweight foam material.

6. The metal foil according to claim 4, wherein said foam layer is non-combustible.

7. The metal foil according to claim 4, wherein said foam layer has a layer thickness within a range of from 5 to 50 mm.

8. The metal foil according to claim 1 wherein the thickness is within a range of from 25 to 500 μm.

9. The metal foil according to claim 1 wherein the average diameter of the resulting perforations is within the range of 200 to 500 μm.

* * * * *